United States Patent Office 2,833,657
Patented May 6, 1958

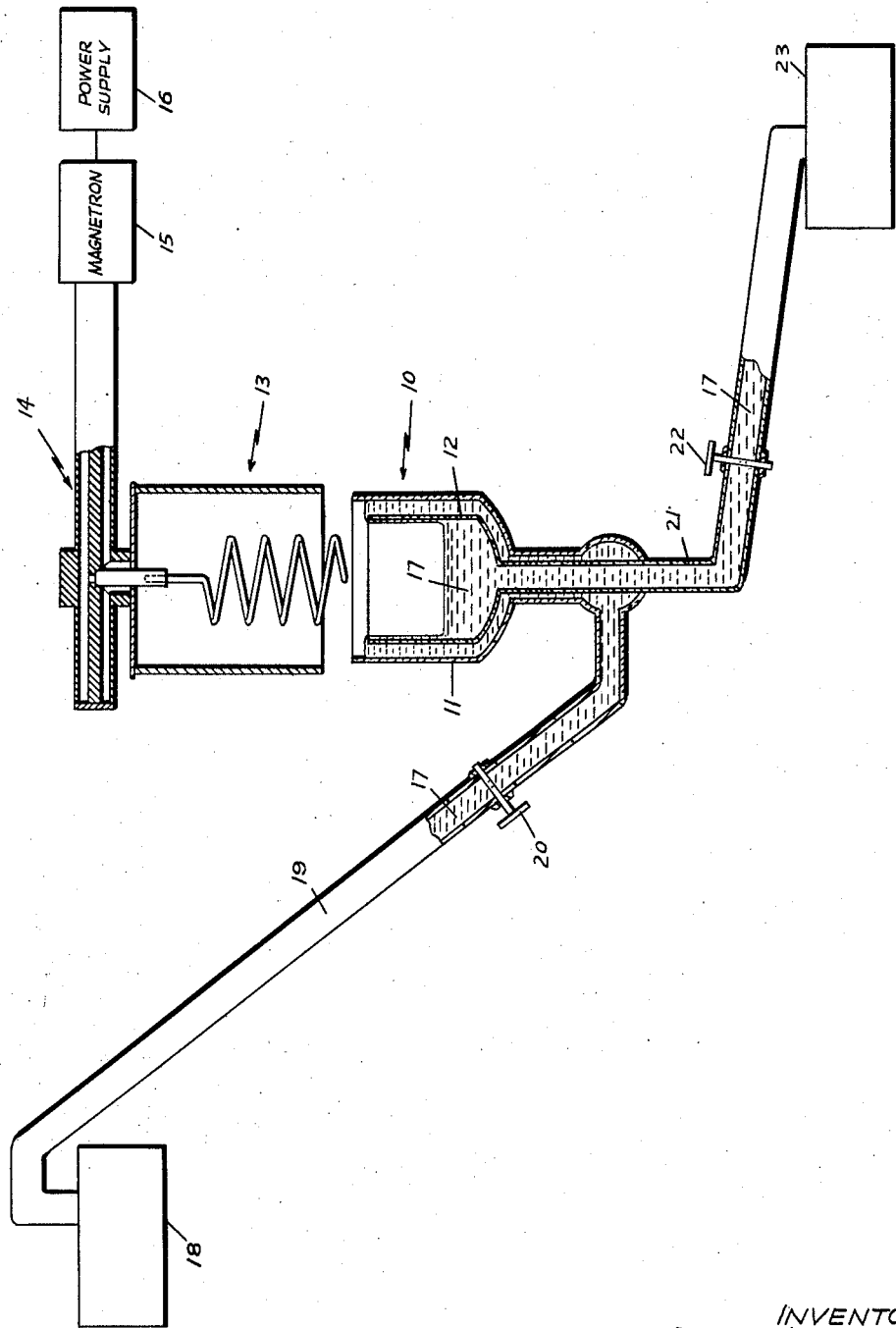

2,833,657

MICROWAVE IRRADIATION OF FRUIT JUICES

David A. Copson, Waltham, Mass., assignor to Raytheon Manufacturing Company, Waltham, Mass., a corporation of Delaware Application January 8, 1954, Serial No. 402,936

5 Claims. (Cl. 99—221)

This invention relates to the processing of fruit juices and more particularly to the inactivation of enzymes and microorganisms therein with microwave energy.

It is well known in the fruit juice industry that among the enzymes in raw fruit juices, the activity of pectinmethylesterase causes a de-stabilizing effect on such juices. This enzyme catalyzes the hydrolytic removal of methoxyl groups from the pectin molecule to form low ester pectins. This reaction results in a separation of the liquids and solids in the juice so that the normal cloudy appearance of a fruit juice is not retained and, in addition, gelatin may occur. Furthermore, the flavor and feel associated with such juices are lost.

Attempts to inactivate the enzymes and other microorganisms in fruit juices through the use of high pasteurization temperatures have been unsuccessful because the juice develops a cooked, bitter, or oxidized off-flavor taste to some degree. Likewise, immobilization of these enzymes and microbes by storing a juice concentrate at very low temperatures proved to be an inadequate solution because carelessness in shipping and handling, unavoidable power failures, and inadequate freezer compartment temperatures in household refrigerators presented too many uncontrollable ways in which deterioration could occur. Attempts to use heat exchangers, through which the fruit juice can be passed to inactivate the enzymes, also left much to be desired. Since these exchangers all require a surface at which heat is transferred from a thermal energy source to the product, and a greater temperature must be applied at this interface to bring the entire mass of the product to some desired temperature, there is a tendency to cook the sensitive juice components passing adjacent to and along this surface, thereby causing the above-mentioned deleterious effects. Thus, it can be understood that a new process for inactivating the enzyme and microbe content of fruit juices while retaining their quality, appearance, and flavor is needed.

This invention involves the discovery that microwave energy can be used to irradiate and inactivate the enzymes and microorganisms found in fruit juices without impairing these juices in any way. It has also been determined that, in order for the microwave energy to properly act on these enzymes and microorganisms, the discharge temperature of the juice being irradiated should be maintained within a range of about 60 degrees C. to 80 degrees C. Thus, the microwaves employed in the application of this invention also provide a means for raising the temperature of the juice to a point within the aforementioned range of temperatures, and a counter-flow device has been constructed to utilize this energy efficiently.

To illustrate how microwaves can be employed in accordance with the principles of this invention, an orange juice concentrate has been selected as the particular product to be irradiated. However, the juice selected need not be in a concentrated form and other fruit juices, such as lemon, tangerine, grapefruit and the like, can be used as well. For the purposes of this specification and the appended claims, tomato juice should also be included as a fruit juice. Thus, in one particular embodiment of the invention, a supply of orange juice concentrate is passed through and removed from a counter-flow system consisting of two concentric glass bowls which are adapted to receive microwave radiations from above and so arranged that the juice flows into the outer bowl and over the rim of the inner bowl to partially fill it. A special microwave applicator, consisting of a magnetron connected to a helical radiator or director, has been constructed to expose the juice to microwave energy and to direct and concentrate this energy within the area in the inner bowl of the counter-flow system. Therefore, a controlled flow of concentrate can be passed through this bowl, irradiated for a predetermined period of time, and passed into a storage container. It has been experimentally determined that the enzymes and microorganisms in the juice are completely inactivated during this irradiation period, and the juice retains its quality, appearance, and flavor. As the concentrate enters the storage container, it can then be cooled in preparation for the final canning process.

The counter-flow device employed enables a high degree of energy to be recovered and, since microwave irradiation is selective and occurs essentially in the juice and not in the glass of the bowls, a high degree of efficiency is obtained from this process. Also, because there is no exchange of heat between a hot surface and the concentrate, as in conventional exchangers, energy absorption is not dependent on a heat differential existing between a surface area and the concentrate. Therefore, the danger of overheating, which has always been a problem in inactivating enzymes with heat exchangers, is avoided and the possibility of developing an unpleasant taste in the processed juice is obviated.

This invention and the features thereof will be understood more clearly and fully from the following description of one embodiment of the invention with reference to the accompanying drawing wherein the single figure shows an apparatus for irradiating fruit juices with microwaves to inactivate the enzymes and microorganisms therein.

Referring now to the drawing, a counter-flow device 10 consisting of a pair of concentric glass bowls 11 and 12 adapted to receive microwave radiations and a fruit juice concentrate is shown. A shielded helical radiator or director 13 connected through suitable coupling means 14 to a magnetron oscillator 15 is used to concentrate and generate microwave energy in the counter-flow device 10. The magnetron oscillator 15 is operated by a suitable power supply 16, and, for the purposes of this particular embodiment of the invention, the magnetron is a continuous wave, fixed frequency oscillator designed to operate at about 2450 megacycles with approximately 700 watts average power output. However, it should be understood that, where the term "microwave" is used in the specification and claims, it refers to those waves having a free-space wave length from about fifty centimeters to one millimeter, and is not limited to the specific example described herein. It can be seen that the helical coil within the director 13 is of approximately the same diameter as that of the inner bowl 12 of the counter-flow device 10. Thus, when the magnetron is energized and the director is positioned slightly above the counter-flow device, as shown in the drawing, substantially all of the microwave energy generated is concentrated in the space within the outer bowl 11.

A suitable fruit juice, which in this example is an orange juice concentrate 17, is stored in a reservoir 18 which is, in turn, connected through a flow line 19 and a control throttle 20 to the outer bowl 11. Thus, the concentrate 17 can be continuously passed into the outer bowl 11 so that it fills this bowl and flows over the rim of the inner bowl 12 to occupy approximately a third to a half of the volume thereof. The inner bowl 12 is provided with an outlet at the bottom which is, in turn, connected through a second flow line 21 and a throttle 22 to a storage container 23. This container can be adapted with suitable cooling means to lower the temperature of the concentrate after it has been irradiated in preparation for the canning process.

By controlling the flow of the juice concentrate 17 with the throttles 20 and 22, the volume of concentrate being irradiated within the counter-flow device 10 can be fixed at any level desired. The particular direction of flow described above, that is, the direction of flow from the outer bowl 11 into the inner bowl 12, was chosen because it has been determined that microwave energy will be best intercepted by the concentrate when the outer bowl is filled. Also, when a thin film of concentrate is allowed to flow down the inner face of the bowl 12, this particular presentation requires only a short irradiation time in order to completely inactivate the enzymes and microbes within the juice. Furthermore, this direction of flow leaves room within the inner bowl for the concentrate to expand and provides space in which any gases formed can be easily dispersed. In addition, a heat exchange relationship exists in the upper part of the counter-flow device 10 when the thin film of concentrate is irradiated and is flowing adjacent to the cooler fluid in the outer bowl. Thus, thermal energy recovery in this system is good and has been determined to be as high as ninety-two percent when the equipment is properly operated.

An example of how the above-described apparatus operates under specific conditions will now be explained. If the initial temperature of the concentrate 17, when it is in the reservoir 18, is approximately room temperature or about twenty-three degrees C., and throttle 20 is fully opened, 107 milliliters of concentrate per minute will continuously pass into and out of the counter-flow device 10 while the inner bowl 12 remains about one-third full. A fixed level is maintained by controlling the flow with throttle 22. As the fluid enters inner bowl 12, the magnetron is energized and its anode current in this particular embodiment will be about 250 milliamperes. Thus, as the concentrate passes through the inner bowl, it is irradiated, and the temperature of the concentrate rises to about eighty degrees C. After the concentrate leaves the inner bowl and flows into the storage container 23, it can be cooled and canned in ways well known in the fruit juice industry. Tests made on the concentrate after it had been irradiated, in accordance with the above-described procedure, show complete inactivation of the enzymes and micro-organisms therein. Furthermore, flavor tests determined that the orange juice concentrate retains its natural flavor when this process is employed, and the quality of the juice is not impaired in any way.

However, it should be understood that this invention is not limited to the particular details described above as many equivalents will suggest themselves to those skilled in the art. For example, other sources of microwave energy, such as a klystron substituted for the magnetron, can be employed, and the wave lengths generated can be varied within the limits previously mentioned above. Furthermore, although the irradiation of orange juice has been described, all fruit juices can be similarly inactivated. Likewise, devices, other than the counter-flow apparatus, can be employed to pass the fruit juice under the influence of microwave energy, and the size and shape of the component parts utilized are not limited as long as the juice is suitably irradiated. Therefore, it is desired that the appended claims be given a broad interpretation commensurate with the scope of the invention within the art.

What is claimed is:

1. The method of treating fruit juices and fruit juice concentrates, said method comprising causing a continuous stream of said juice material to flow at ambient temperature, filming a portion of said continuous stream, irradiating and treating said filmed portion with microwave energy having a wavelength in the range of substantially 1 to 500 millimeters for a period of time sufficient to substantially completely inactivate the enzymes and microorganisms therein, and maintaining said filmed portion in intimate heat exchange relationship with a substantially untreated portion of said continuous stream whereby heat in said irradiated juice material is continuously removed and absorbed by said untreated material.

2. The method of treating fruit juices and fruit juice concentrates, said method comprising causing a continuous stream of said juice material to flow at ambient temperature, filming a portion of said continuous stream, irradiating and treating said filmed portion with microwave energy having a wavelength in the range of substantially 1 to 500 millimeters and at an average energy input of about 700 watts with a filmed flow of about 107 milliliters per minute for a period of time sufficient to substantially completely inactivate the enzymes and microorganisms therein, and maintaining said filmed portion in intimate heat exchange relationship with a substantially untreated portion of said continuous stream whereby heat in said irradiated juice material is continuously removed and absorbed by said untreated material.

3. A device for inactivating the enzymes and microorganisms in fruit juices and fruit juice concentrates comprising a pair of open-ended concentric containers, means connected to the outer of said containers for passing said juice material into the space between said containers, said containers including means adapted to cause said juice material to flow in the space between said containers and into the inner of said containers in a relatively thin film, microwave energy generating means positioned above the open ends of said containers for irradiating said juice material with microwave energy having a wavelength in the range of 1 to 500 millimeters, said last-named means including a source of microwave energy and a radiator coupled to said source and adapted to direct and concentrate said energy into said juice, and outlet means connected to said inner container.

4. A device for inactivating the enzymes and microorganisms in fruit juices and fruit juice concentrates comprising a pair of open-ended concentric containers, means connected to the outer of said containers for passing said juice material into the space between said containers, said containers including means adapted to cause said juice material to simultaneously flow along the inner and outer surfaces of said inner container in counter-current relationship whereby the juice material in said counter-currents is held in intimate heat exchanging relation, microwave energy generating means positioned above the open ends of said containers for irradiating said juice material with microwave energy having a wavelength in the range of 1 to 500 millimeters, said last-named means including a source of microwave energy and a radiator coupled to said source and adapted to direct and concentrate said energy into said juice, and outlet means connected to said inner container.

5. A device for inactivating the enzymes and microorganisms in fruit juices and fruit juice concentrates comprising a pair of open-ended concentric containers, means connected to the outer of said containers for passing said juice material at a predetermined rate into the space between said containers, said containers including means adapted to cause said juice material to flow upwardly in the space between said containers and then over the top edge of the inner of said containers and downwardly in a thin film along the inner surface of said inner container, microwave energy generating means positioned above the open ends of said containers for irradiating said juice material with microwave energy having a wavelength in the range of 1 to 500 millimeters, said last-named means including means adapted to concentrate and direct microwave energy substantially into said film of said juice material without causing any substantial amount of said energy to be applied to the juice in said outer container, and outlet means connected to said inner container.

References Cited in the file of this patent

UNITED STATES PATENTS

| | | |
|---|---|---|
| 1,863,222 | Hoermann | June 14, 1932 |
| 2,089,966 | Kassner | Aug. 17, 1937 |
| 2,476,251 | Swenson | July 12, 1949 |
| 2,495,429 | Spencer | Jan. 24, 1950 |
| 2,576,862 | Smith et al. | Nov. 27, 1951 |
| 2,585,970 | Shaw | Feb. 19, 1952 |